Sept. 9, 1958     D. E. VANCE     2,851,179
POWER BLEACHER OPERATOR
Filed June 25, 1956     2 Sheets—Sheet 1
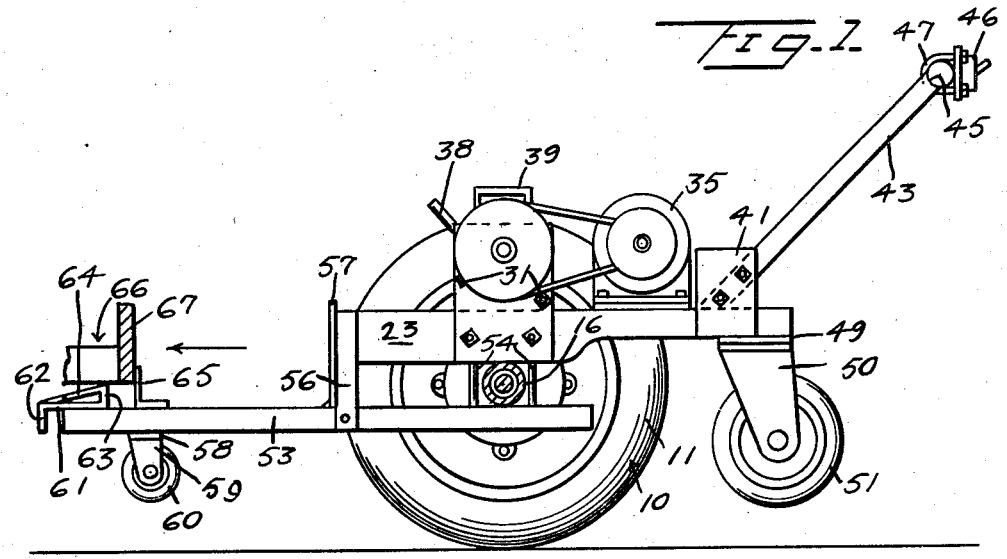
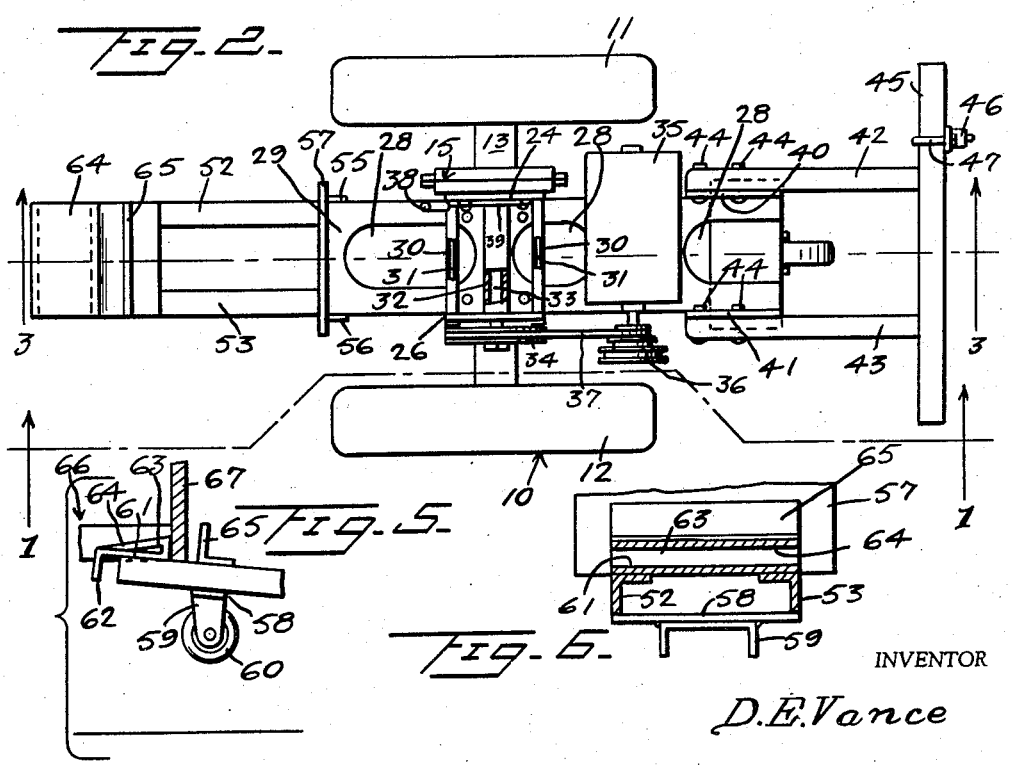
INVENTOR
D. E. Vance
BY Kimmel & Crowell
ATTORNEYS

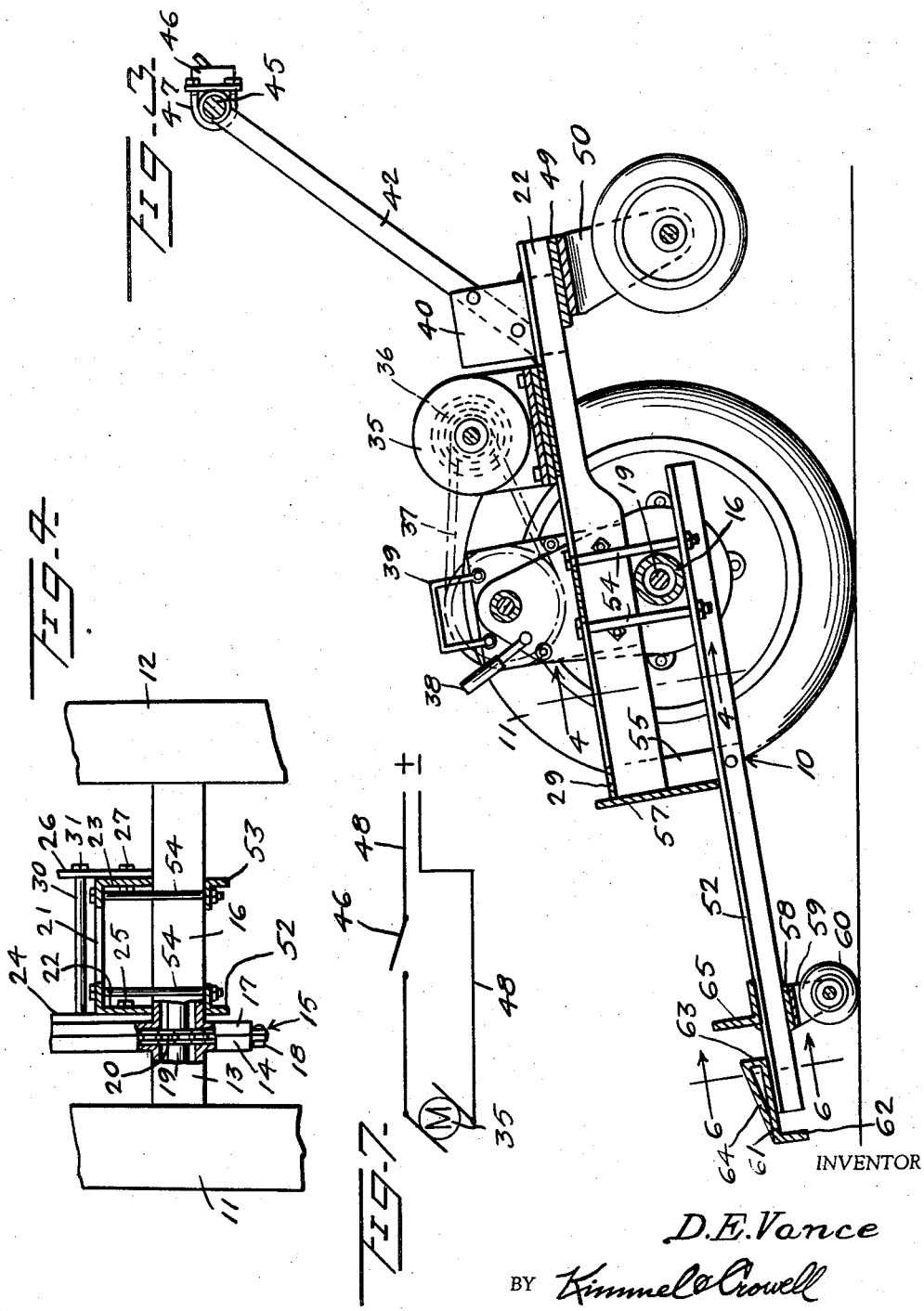

United States Patent Office 2,851,179
Patented Sept. 9, 1958

2,851,179

POWER BLEACHER OPERATOR

Donald E. Vance, Champaign, Ill., assignor of twenty-five percent to Harold C. Vance, ten percent to A. Eleanor Vance, ten percent to C. Marcella Vance, fifteen percent to J. W. Thrasher, trustee, Champaign, Ill., and fifteen percent to Harris Trust & Savings Bank, Chicago, Ill., trustee Application June 25, 1956, Serial No. 593,723

2 Claims. (Cl. 214—370)

The present invention relates to power bleacher operators, and more particularly to a power driven device for opening and closing folding bleachers of the type used in gymnasiums.

The primary object of the invention is to provide a portable wheeled operator having reversing mechanism associated therewith so that the operator can push or pull folding bleachers to their closed or opened position.

Another object of the invention is to provide a device of the class described above in which geared ground engaging wheels support the operator and give traction thereto.

A further object of the invention is to provide a power bleacher operator which is inexpensive to manufacture, simple to operate and adjust, and completely effective in its action.

Other objects and advantages will become apparent in the following specification when considered in the light of the attached drawings, in which:

Figure 1 is a longitudinal cross-section of the invention taken along the line 1—1 of Figure 2, looking in the rection of the arrows.

Figure 2 is a top plan view of the invention shown partly broken away for convenience of illustration.

Figure 3 is a longitudinal cross-section of the invention taken along the line 3—3 of Figure 2, looking in the direction of the arrows.

Figure 4 is an enlarged fragmentary vertical cross-section taken along the line 4—4 of Figure 3, looking in the direction of the arrows.

Figure 5 is a fragmentary side elevation similar to Figure 1, illustrating another position of the device.

Figure 6 is a transverse cross-section taken along the line 6—6 of Figure 3, looking in the direction of the arrows, with parts broken away for convenience of illustration.

Figure 7 is a diagrammatic showing of the circuit used in the device.

Referring now to the drawings in detail wherein like reference characters indicate like parts throughout the several figures, the reference numeral 10 indicates generally a power bleacher operator machine constructed in accordance with the invention.

The machine 10 is provided with a pair of parallel spaced axially aligned wheels 11 and 12. The wheel 11 has a tubular axle housing 13 extending inwardly therefrom and carrying at its inner end a portion 14 of a gear housing 15. The wheel 12 has a tubular axle housing 16 extending inwardly therefrom with a portion 17 of the gear housing 15 secured thereto. The portions 14 and 17 of the gear housing 15 are secured together by securing elements 18, as best seen in Figure 4.

An axle 19 has its opposite ends secured in driving relation to the wheels 11 and 12 and extends through the axle housings 13 and 16 and the gear housing 15. Conventional gearing 20 is operatively associated with the axle 19 and is contained within the gear housing 15.

An elongated channel member 21 is provided with a pair of parallel depending flanges 22 and 23 and is positioned with the lower edges of the flanges 22 and 23 in contact with the axle housing 16 adjacent a medial portion of the channel 21.

A plate 24 is secured to the flange 22 by means of bolts 25 and extends upwardly therefrom. The gear housing 15 is secured to the plate 24 by any suitable means. A plate 26 is secured to the flange 23 by means of bolts 27 and extends upwardly therefrom in parallel relation to the plate 24. The channel member 21 is provided with a plurality of weight reducing openings 28 in the bight 29 thereof, as best seen in Figure 2.

The gear box 15 is secured by any suitable means to the plate 24 and is carried thereby. The plates 24 and 26 have tubular spacers 30 positioned therebetween and are secured together by means of bolts 31 extending through the tubular spacers 30. A tubular shaft mounting 32 extends between the plates 24 and 26 adjacent the upper edges and is secured to the plates 24 and 26 by any suitable means. A shaft 33 is journalled in the tubular shaft mounting 32.

The shaft 33 extends at one end into the gear box 15 being operatively associated with the gearing 20 therein. The opposite end of the shaft 33 extends beyond the plate 26 and has a pulley 34 mounted thereon. An electric motor 35 is secured to the bight 29 of the panel 21 and has a pulley wheel 36 connected thereto.

A belt 37 connects the pulley wheel 36 and the pulley wheel 34 so that the motor 35 can turn the shaft 33. The gearing 20 in the gear box 15 is of a reversing type and is adapted to be reversed by means of the reverse lever 38 extending from the gear box 15. A handle 39 having an inverted U-shaped form is secured to the upper end of the plate 24 and is adapted for use in craning the operator 10 when necessary to lift it from one position to another.

The flanges 22 and 23 of the channel member 21 have their lower edges cut away at the rear end portions thereof as best illustrated in Figures 1 and 3. A pair of plates 40 and 41 are secured to the flanges 22 and 23, respectively, and extend upwardly therefrom, as shown in Figures 1 and 3.

A pair of spaced parallel handle shafts 42 and 43 are secured to the plates 40 and 41, respectively, by means of bolts 44. The handle shafts 42 and 43 extend upwardly and rearwardly at an angle and carry at their upper rear ends a transversely extending handle bar 45. A hand controlled toggle switch 46 is clamped to the handle 45 by means of a U-bolt 47 and is connected by suitable electrical wiring 48 to the electric motor 35 and to a source of electric energy.

A plate 49 is secured to the underside of the flanges 22 and 23 and extends therebetween in parallel relation to the bight 29 of the channel member 21. A U-shaped fork 50 is arranged in depending relation on the lower side of the plate 49 and is secured thereto by any suitable means. A wheel 51 is journalled in the fork 50, for reasons to be assigned.

A pair of spaced parallel angle frame members 52 and 53 are positioned with their rear end portions in engagement with the axle housing 16 in parallel relation to the channel member 21. The angle members 52 and 53 are secured to the channel member 21 by means of spaced pairs of elongated bolts 54 positioned on opposite sides of the channel member 21 and on opposite sides of the axle housing 16.

A pair of plates 55 and 56 are secured to the flanges 22 and 23 of the channel member 21 adjacent the forward ends. The plates 55 and 56 extend downwardly from the channel member 21 and are secured to the angle frame members 52 and 53 by any suitable means.

A transversely extending plate 57 is carried by the forward edges of the plates 55 and 56 and extends upwardly from the top edges of the frame members 52 and 53. The plate 57 extends upwardly beyond the upper edge of the channel member 21.

A plate 58 extends transversely of the frame members 52 and 53 on the lower side thereof adjacent the forward ends thereof and is secured thereto by any suitable means, such as welding or the like. An inverted U-shaped fork 59 is carried by the plate 58 in depending relation thereto and has a dolly wheel 60 journalled therein, as best seen in Figures 5 and 3.

A web 61 of generally rectangular flat form is secured to the forward end portions of the upper side of the frame members 52 and 53 in a position so as to extend beyond the forward end of the frame members 52 and 53. An integral depending flange 62 is secured to the forward edge of the web 61, as best seen in Figure 3.

A flange 63 extends integrally from the rear edge of the web 61 at right angles thereto in a direction opposite to the flange 62. A cam plate 64 is integrally joined to the upper edge of the flange 63 and extends forwardly and downwardly at an angle to the horizontal to the forward edge of the web 61 to which it is secured by means of welding or the like.

An upstanding angle iron cleat 65 is positioned on the upper surface of the frame members 52 and 53 and is secured thereto by means of welding or the like. The cleat 65 is positioned rearwardly from the flange 63 in parallel relation thereto and has a height above the frame members 52 and 53 somewhat greater than the flange 63.

The machine 10 is adapted to be used with folding bleachers, a fragment of which is shown at 66. The folding bleachers 66 normally have at their outer edge an upstanding plate 67 with which the machine 10 is adapted to cooperate.

In the use and operation of the machine 10, the flange 63 is adapted to engage behind the lower edge of the plate 67, as seen in Figure 5, so that the machine 10 can, when the gears 20 are in reverse, pull against the plate 67 to unfold the bleachers 66. The flange 63 is engaged behind the plate 67 by tilting the machine 10 about the axis of the axle 19 raising the forward end of the frame members 52 and 53 to the position shown in Figure 5.

In closing the bleacher 66, the cleat 65 is engaged against the lower outer face of the plate 67 as shown in Figure 1, and with the gears 20 in forward drive position the machine 10 is caused to push the bleachers 66 inwardly to their closed or folded position.

The plate 57 serves as a safety should the cleat 65 miss engagement with the plate 67, and can also be used for pushing inwardly against the plate 67 under conditions wherein the cleat 65 cannot engage the plate 67. The wheels 51 and 60 serve to prevent undue pivotal action of the machine 10 about the axle 19 and support the machine 10 when in rest position.

Having thus described the preferred form of the invention, it should be understood that numerous structural modifications and adaptations may be resorted to without departing from the scope of the appended claims.

What is claimed is:

1. In combination an extensible, retractible bleacher seat unit having a generally upright depending plate arranged adjacent the front portion thereof, and a power bleacher operator comprising, a pair of ground engaging power wheels, a generally horizontal elongated frame having an intermediate portion thereof supported on said wheels, power means mounted on said frame for driving said wheels, a flange secured in upstanding relation to the forward end portion of said frame, a cam plate having its upper rear edge secured to the upper edge of said flange with said cam plate sloping downwardly and forwardly therefrom, a cleat arranged in rearwardly spaced parallel relation to said flange and having a height substantialy greater than the height of said flange secured in upstanding relation to said frame adjacent said flange, a dolly wheel dependingly secured to the forward end portion of said frame beneath said cleat, a wheel mounted in depending relation to the rear end portion of said frame, said dolly wheel and said last named wheel each being elevated from the supporting surface when said frame is in horizontal position and each being selectively engageable with the supporting surface by tilting said frame about said driving wheels, said cleat being engageable with the outer lower edge of said plate thereby spacing and guiding said flange for engagement with the inner lower edge of said plate on upward movement of the forward end portion of said frame coupling said bleacher seat unit and said power operator for pulling said bleacher seat unit to open position, and means secured to said frame rearwardly of said cleat for engaging said bleacher seat unit to push said bleacher seat unit closed position.

2. In combination an extensible and retractible bleacher seat unit having a member secured to the front edge portion of said unit spaced from the unit supporting surface and powered portable wheeled operator detachably connected to said member for extending and retracting said unit comprising, a pair of ground engaging power driven wheels, a frame mounted on said wheels for pivotal movement thereon, said frame having portions thereof extending respectively forwardly and rearwardly of said wheels, hand grip means secured to the rear portion of said frame and extending upwardly and rearwardly therefrom for guiding said operator, a dolly wheel mounted on the underside of the forwardly extending portion of said frame at the forward end thereof, a first stop member positioned on the upper side of the forward end portion of said frame rearwardly of the forward end thereof, a second stop member substantially shorter in height than said first stop member having a downwardly and forwardly inclined upper surface and positioned on said frame in forwardly spaced apposed relation to said first stop member, and a depending member secured to the forward end of said inclined upper surface of said second stop member in forwardly spaced relation to the forward end of said frame, said first stop member engaging the forward lower edge portion of said first named member aligning said second stop member for engagement with the rear lower edge of said first named member on upward pivotal movement of said frame detachably connecting said power operator to said bleacher seat unit.

References Cited in the file of this patent

UNITED STATES PATENTS

| | | |
|---|---|---|
| 105,564 | Gilson | July 19, 1870 |
| 2,491,963 | Fons | Dec. 20, 1949 |
| 2,568,445 | Grattan | Sept. 18, 1951 |
| 2,665,139 | Schroeder | Jan. 5, 1954 |
| 2,709,493 | Hupp | May 31, 1955 |